Oct. 5, 1954   A. VISCHER, JR   2,691,090
PRESSURE CONTROL APPARATUS FOR PRESSURE COOKERS
Filed June 21, 1949   3 Sheets-Sheet 1
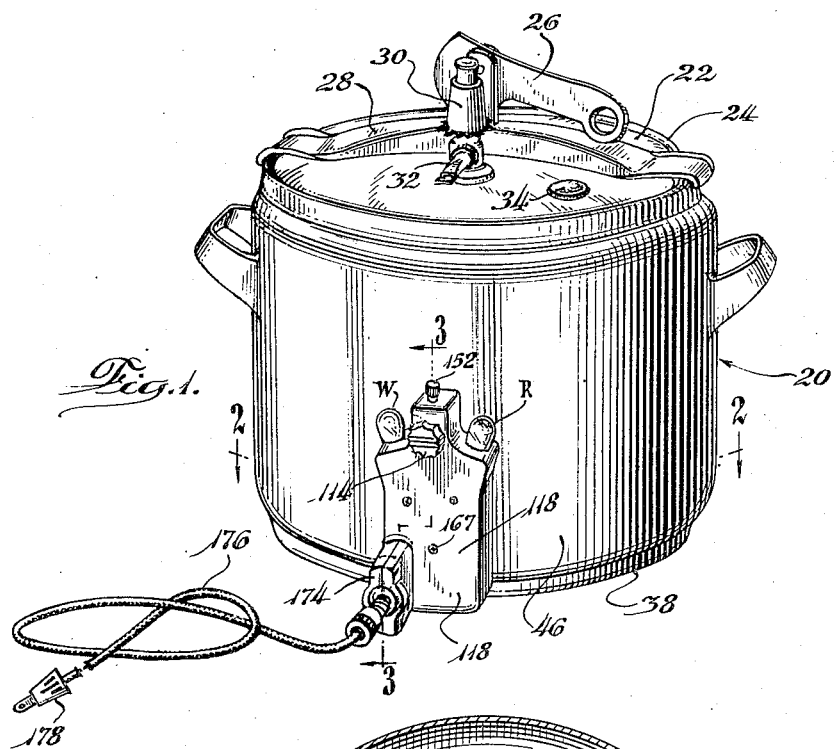
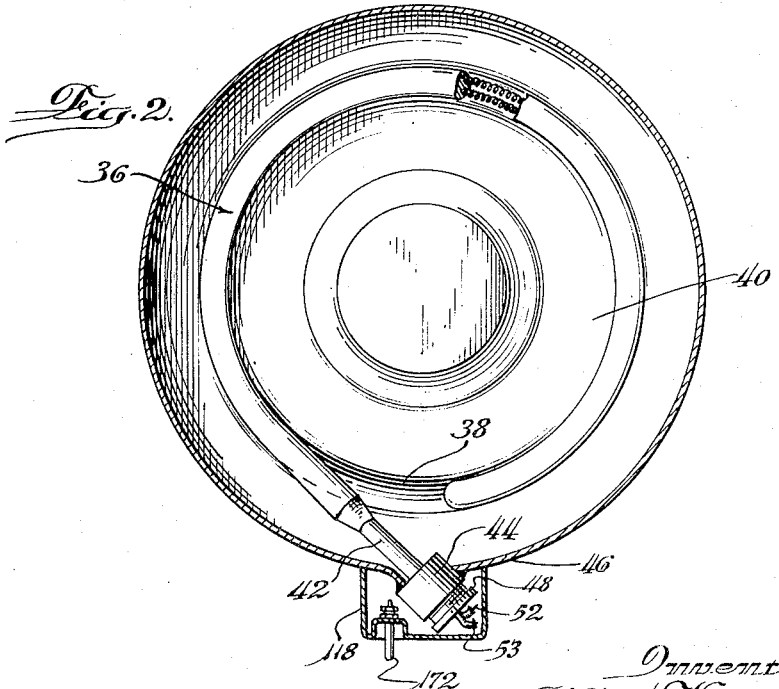

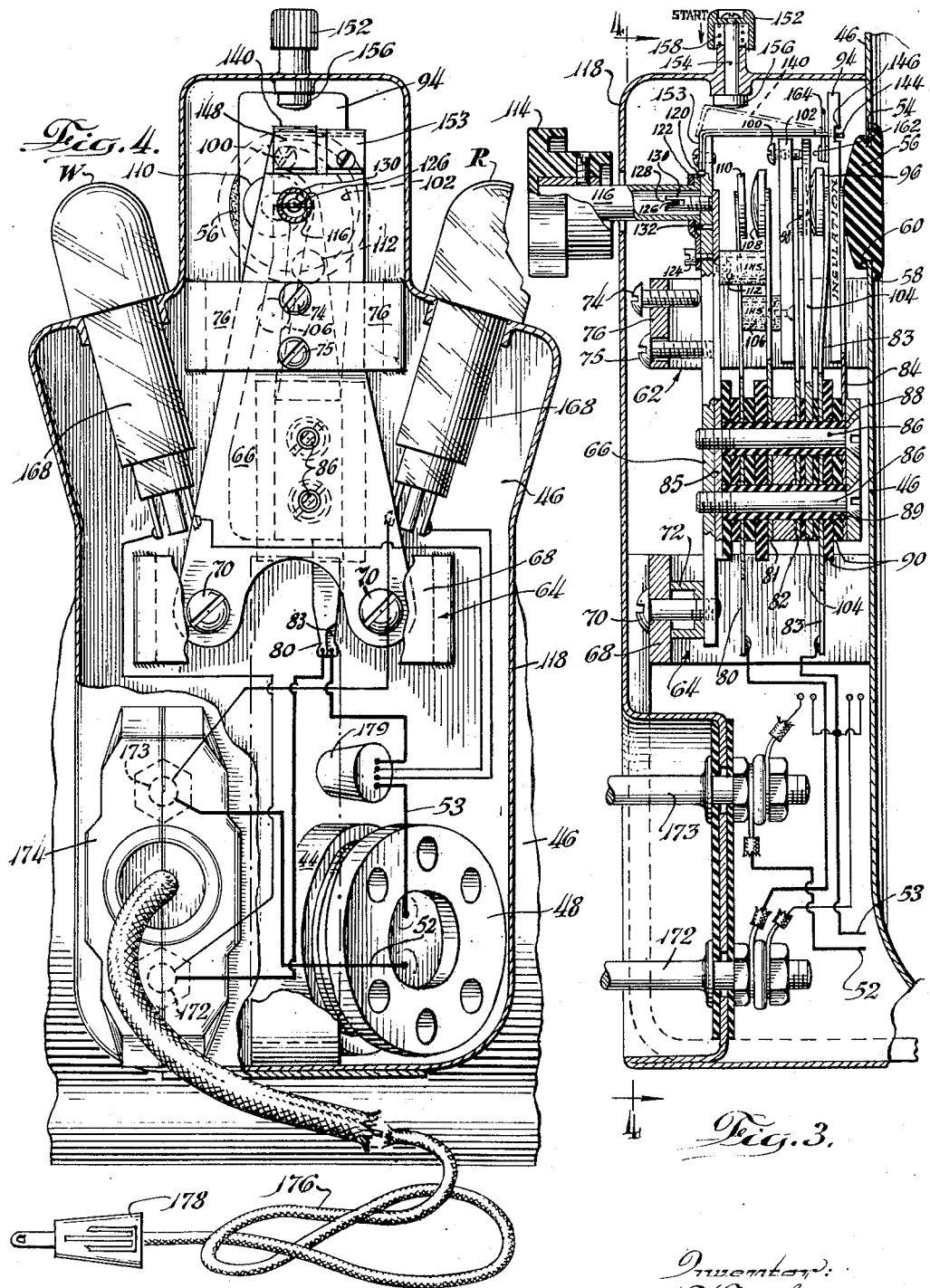

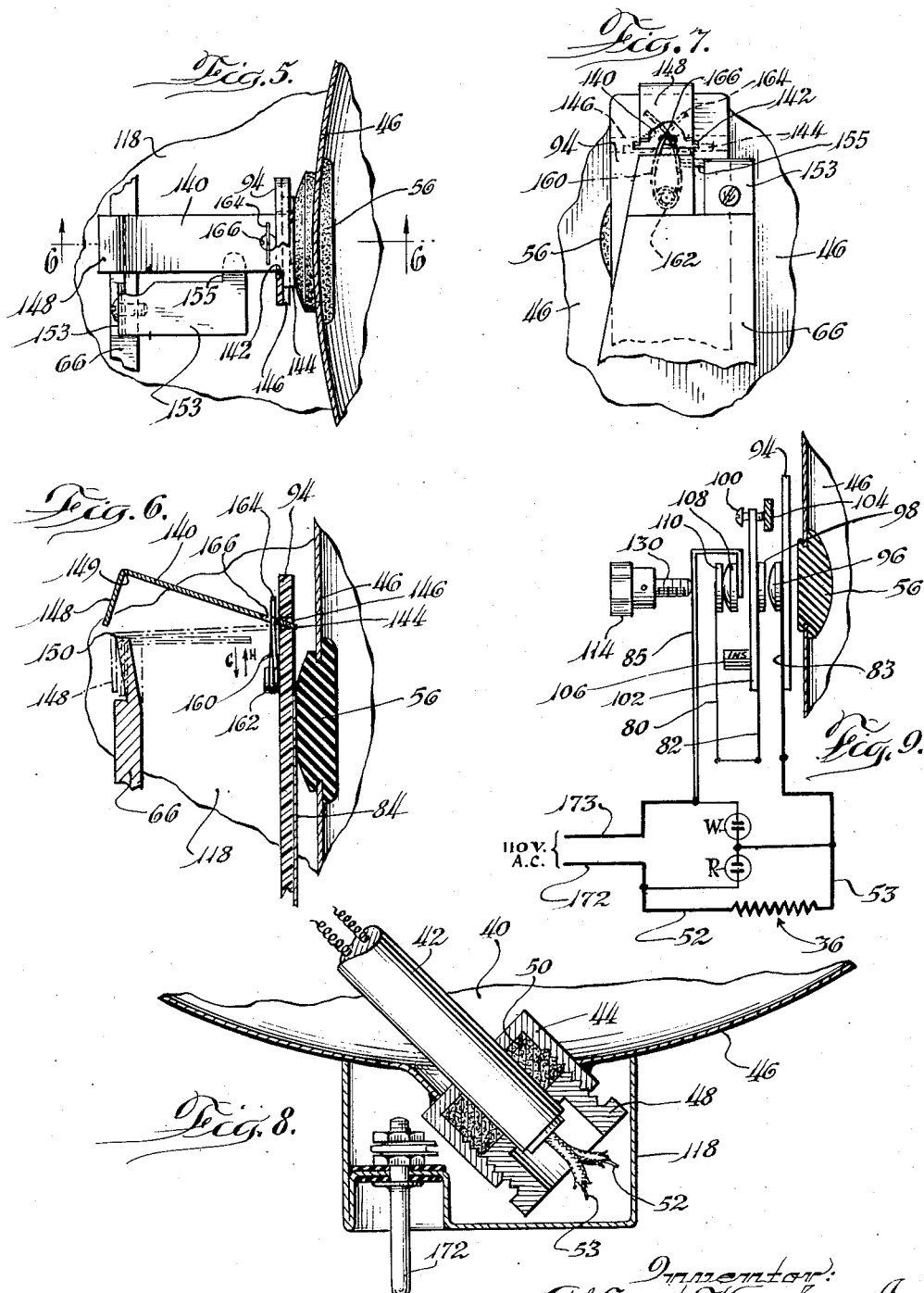

Patented Oct. 5, 1954

2,691,090

UNITED STATES PATENT OFFICE 2,691,090

PRESSURE CONTROL APPARATUS FOR PRESSURE COOKERS

Alfred Vischer, Jr., Park Ridge, Ill., assignor of two-thirtieths to Alfred Vischer III, two-thirtieths to William Vischer, two-thirtieths to Alfred Vischer, Jr., as trustee of Peter Vischer Trust, four-thirtieths to Walter W. Zitzewitz, four-thirtieths to Elmer K. Zitzewitz, one-thirtieth to Gertrude J. Zitzewitz, one-thirtieth to Barbara O. Zitzewitz, and two-thirtieths to Gertrude V. Bouton Application June 21, 1949, Serial No. 100,346

6 Claims. (Cl. 219—43)

My invention relates generally to pressure control apparatus, and more particularly to such apparatus for use in controlling and maintaining the desired operating pressure in pressure cookers and canners.

In canning and preserving foods, especially in homes, one of the primary problems is the maintenance of a constant temperature throughout the sterilization or canning processes. Properly to sterilize foods for canning, requires that the food be maintained at a certain temperature for a predetermined time interval. While these two factors may differ for various foods, it is highly desirable that means be provided for controlling both factors accurately. The time factor may be controlled quite readily by a suitable time clock device, but in the past the person attempting domestic canning did not have available means for maintaining the temperature constant for the desired interval during the canning process.

Most canners are equipped with means to prevent the pressure within the canner from exceeding a predetermined value, such as 15 p. s. i. (gauge) or 10 p. s. i., but no means are provided to prevent the pressure from dropping below the predetermined desired value, and thus, in endeavors to maintain the proper pressure in the canner, it was necessary, at very frequent intervals, to adjust the device supplying heat to the canner, and even if the operator was meticulous in making such adjustments, substantial fluctuations in the pressure within the cooker were nearly inevitable.

It will be understood that in pressure cooking operations, the temperature of the steam surrounding the food is directly related to the pressure within the cooker, provided, of course, that the cooker does not contain air. Thus, for example, at a pressure of 15 p. s. i., saturated steam will have a temperature of 250° F., while at 10 p. s. i. the temperature of saturated steam is 240° F. Furthermore, as the food within the pressure cooker is raised in temperature, the rate at which it is capable of absorbing heat diminishes to a certain extent, depending upon the character and amount of the food within the canner. Thus, even if the application of heat to the canner is at a uniform rate, the pressure (and hence the temperature) within the canner will tend to rise, and the operator must accordingly reduce the rate of application of heat to the canner.

Thus in domestic canners of the prior art, it was always necessary for the housewife to maintain a close watch on the pressure indicator of the canner, and to regulate the height of the gas flame or the current input to the heating unit of an electric range at frequent intervals, in order to maintain the pressure in the canner at, or reasonably close to, the desired cooking pressure, usually 15 p. s. i. or 10 p. s. i.

In the past, it has been attempted to avoid such undesirable fluctuations in pressure in the canner by using an unnecessarily large quantity of water in the canner. Such excess water, due to its latent heat, served as a heat reservoir, ballast, or cushion, and to a certain extent alleviated the difficulty of wide fluctuations in pressure. The use of such excess water, however, was undesirable in that it greatly increased the time required to heat the water to the temperature of 250° F. (or 15 p. s. i.), and correspondingly lengthened the time required to cool the canner and its contents from the desired canning temperature to a temperature slightly below 212° F., at which the pressure within the canner dropped to atmospheric pressure. Therefore, the "time cycle" of the canner was greatly lengthened.

"Time cycle" is used herein to mean the time required to complete one cycle of a canning operation. In normal canning operations, the time cycle starts as the canner is heated, until a sufficient amount of the water therein has been converted into steam and discharged through the vent for a sufficient length of time to assure that all of the air initially contained in the canner has been exhausted. The operator then closes the vent, usually by a gravity operated vent valve. During the initial portion of the time cycle, the water within the container (assuming that the canning is to be done at 15 p. s. i.), must first be heated to 250° F., meanwhile converting sufficient of the water into steam to raise the pressure to 15 p. s. i. Thereafter the pressure is maintained at 15 p. s. i. for a length of time determined by the particular food being canned. The application of heat is then discontinued, and the pressure permitted to drop to atmospheric, due to radiation or other losses of heat from the canner. When the pressure has dropped to atmospheric pressure, and the food has been removed the time cycle is completed.

It will be clear from the foregoing that if excessive water is used in the canner, the time cycle will be greatly lengthened due to the increased time required to raise the canner and its contents to the desired canning temperature, and to the increased length of time required for the canner and its contents to be cooled sufficiently that the pressure therein will drop to atmospheric pressure.

During the time that the pressure within the canner is being raised from atmospheric to the canning pressure, and during the time that the canner is dropping from the canning pressure to atmospheric pressure, the food within the canner is, of course, being subjected to temperatures above 212° F., and to a certain extent chemical changes take place during these periods while the pressure is rising and falling.

In canning delicate foods, such as tomatoes and fruits, it is highly desirable that the food have its temperature quickly raised to the desired sterilization temperature, and then have its temperature quickly reduced, so as to avoid excessive and destructive heating of the food. Such delicate foods, if subjected to a long time cycle (even though the length of time at which the food is maintained at the high sterilization temperature is short) are subject to physical and possibly also chemical deterioration, and it is therefore very difficult properly to can such foods in a canner having a relatively long time cycle, as has been necessary with domestic canners in the past.

The use of an excessive quantity of water in a canner is also of disadvantage, since the aggregate amount of heat required for the canning operation is increased by the use of such excessive water.

It is therefore one of the primary objects of the invention to provide an improved pressure canner or cooker in which a minimum amount of water is required, and, as a consequence, in which the time cycle is relatively short.

A further object is to provide an improved pressure canner or cooker in which the pressure may be maintained automatically at the required canning pressure without attention on the part of the operator.

A further object is to provide an improved pressure control apparatus for pressure canners and cookers, in which changes in calibration are effected incident to each cycle of operation of the canner, so that unavoidable variations in the operation of the various parts of the control apparatus have no noticeable effect upon the operation of the canner.

A further object is to provide an improved pressure control apparatus having safety features, whereby misoperation is prevented or at least indicated.

A further object is to provide an improved pressure control apparatus for pressure cookers and canners, which is combined with the pressure container by such means that there are no tubes, conduits, or passageways which may become clogged, and thus interfere with the proper operation of the control apparatus.

A further object is to provide an improved pressure apparatus for pressure cookers and canners, which does not interfere in any way or make more arduous the task of cleaning the pressure container.

A further object is to provide an improved pressure control apparatus for pressure cookers and canners, which is operable to stop the application of heat to the container in the event that, through inadvertence, an attempt is made to operate the canner without an adequate supply of water.

A further object is to provide an improved pressure control apparatus for pressure cookers and canners, which will stop application of heat to the container upon attainment of an excessively high pressure within the container.

A further object is to provide a pressure control means for pressure cookers and canners, with improved means for indicating the condition of the heat applying means.

A further object is to provide an improved pressure cooker or canner having an immersion type electrical heater, so incorporated in the container that it may be easily cleaned and does not interfere with the placing of the maximum quantity of containers or jars within the cooker.

A further object is to provide a pressure canner in which foods may be canned according to a fixed time table, with uniform results.

A further object is to provide an improved pressure canner having controls incorporated therein for substantially reducing the time cycle, and thereby preventing the overcooking of foods, particularly such delicate foods as fruits and tomatoes.

A further object is to provide an improved pressure canner in which the pressure within the container may be maintained accurately within a small range, in the order of one-quarter p. s. i.

Other objects will become apparent from the following description, reference being had to the accompanying drawings, in which Fig. 1 is a perspective view of a pressure canner or cooker incorporating the invention;

Fig. 2 is a horizontal sectional view, taken on the line 2—2 of Fig. 1;

Fig. 3 is a vertical sectional view of the pressure operated switch mechanism, taken on the broken sectional line 3—3 of Fig. 1;

Fig. 4 is a sectional view, taken on the line 4—4 of Fig. 3;

Fig. 5 is a fragmentary sectional view showing particularly the latch and the bimetal latch releasing thermostat;

Fig. 6 is a fragmentary sectional view, taken on the line 6—6 of Fig. 5;

Fig. 7 is a fragmentary elevational view of the latch and associated mechanism, the latch being broken away more clearly to show its operating spring;

Fig. 8 is a fragmentary sectional view, taken on a horizontal plane, and showing the stuffing box mounting of the immersion type electrical heating element; and Fig. 9 is a partially schematic wiring diagram including some of the switch actuating parts.

Referring to Fig. 1, the invention is illustrated as applied to a pressure canner comprising a container 20, having an internally sealing cover 22, which is preferably of the type disclosed in my prior Patent No. 2,282,011, the cover being warpable to a shape having an elliptical projection in a plane perpendicular to the polar axis thereof due to stresses within the cover, and being capable of being drawn into a convex shape with its periphery in contact with the downwardly facing seating surface (in the form of a gasket) within the lip bead 24 of the container, such flexing of the cover being accomplished by a cam handle 26, which when swung clockwise (Fig. 1) pulls the central portion of the cover 22 upwardly by the action of the cam handle against a cross piece 28 bridging the top of the container 20, and unwarping the cover.

The canner is provided with a pressure relief or safety valve 30, which is preferably of the gravity operated type such as shown in my aforesaid patent, and is also provided with a pressure indicator which may be of the type shown in my prior Patent No. 2,252,874, or may be a customary Bourdon pressure gauge, or its equivalent. The cover 22 has a recess which is closed by a synthetic rubber plug 34 operated as an over pressure or safety release plug in the event that the pressure within the container 22 greatly exceeds the normal cooking and canning pressures.

As best shown in Fig. 2, the canner is provided with an immersion type electrical heating unit 36, which is of arcuate shape extending through about 300 degrees, and which is nearly entirely contained within a rolled reinforcing bead 38 formed in the bottom wall 40 of the container. This heating unit is preferably of the "Calrod" type and has a cylindrical portion 42 which projects through a stuff box bushing 44 welded to the cylindrical wall 46 of the container 20.

As shown in Fig. 8, the stuffing box bushing 44 is internally threaded to receive a packing nut 48 by which a suitable packing 50 may be compressed about the cylindrical portion 42 of the heating element and seal the joint against escape of steam. The packing is, however, sufficiently loose that the heating unit 36 may be swung upwardly about the axis of the cylindrical portion 42 thereof so as to permit thorough cleaning of the unit and of the inside of the bottom of the container 20. The "Calrod" unit is provided with a pair of lead-in wires 52 and 53.

As shown in Fig. 3, the wall 46 of the container has near its bottom a circular opening 54 through which a pressure responsive plug 56 is pressed. When not subjected to pressure, this plug 56 assumes substantially the shape in which it is shown in Fig. 9, but when subjected to pressure the surface thereof within the container becomes substantially flat, while the external surface thereof is bulged outwardly. The plug 56 is provided with an internal flange 58 and a smaller diameter external flange 60 so that it is self-retaining within the opening 54, and may be removed and inserted from the inside of the container. It is made of a suitable elastic and resilient material such as a synthetic rubber, preferably of the perbunan type, which is resistant to deterioration under the effect of oils and greases normally encountered, and which is capable of maintaining its elastic properties throughout the wide temperature range to which it is subjected, namely from room temperature to approximately 250° F. The plug 56 operates as a pressure responsive member to convert the pressure within the container to a corresponding force for the operation of the control apparatus.

The control apparatus is mounted on a pair of generally U-shaped brackets 62 and 64, the ends of the legs of which are welded to the container wall 46. The control switch mechanism is mounted upon a substantially rigid base plate 66, the lower end of which is rigidly secured to the cross portion 68 of the bracket 64 by screws 70 threaded in the plate 66 and holding the lower end of the latter spaced from the cross portion 68 by spacers 72.

While the plate 66 is relatively thick and thus quite rigid, it may be flexed slightly by means of a pair of oppositely acting adjustment screws 74 and 75, which are threaded respectively in the cross piece 76 in the bracket 62 and in the base plate 66. It will be clear that by turning the screw 74 inwardly, while unscrewing the screw 75, the base plate 66 may be flexed toward the plug 56, and by turning the screws in reverse directions, the upper portion of the base plate 66 may be flexed away from the plug 56, such adjustment being normally effected only during the assembly of the apparatus to allow for unavoidable variations in the dimensions of the component parts. All of the control switches are mounted on the base plate 66 so that their positions relative to the plug 56 may be adjusted by the screws 74 and 75 and locked in adjusted position by these screws.

The switch assembly includes four flexible and resilient contact arms 80, 81, 82, and 83, and supplementary leaf spring arms 84 and 85. The lower ends of the arms 80 to 85 are clamped to the base plate 66 by a pair of screws 86 threaded in the plate 66, the screws being surrounded by insulating sleeves 88 and 89, respectively, and all of the switch arms except the arms 81 and 82, being insulated from one another by suitable insulating plates 90, as is customary in switch constructions of this type.

The upper end of the leaf spring 84 bears against the outer surface of the plug 56, and is provided to resist the initial bulging of the latter. When the pressure within the container increases substantially above atmospheric pressure, the upper end of the spring arm 84 engages an insulating strip 94 which is eyeleted or otherwise suitably secured to switch arm 83. The switch arm 83 carries a round head contact rivet 96 which is engageable with a flat surface contact rivet 98 secured to switch arm 82. During assembly of the apparatus, the initial position of the upper end of the switch arm 82 is determined by adjustment of a screw 100 which is threaded in a rigid metal strip 102 secured to the flexible contact arm 82 (preferably by welding), the end of the screw being engageable with a rigid plate 104 mounted in the stack with the remaining contact arms and suitably insulated therefrom.

The strip 102 has secured thereto an insulating pusher 106, which is generally cup-shaped in section, the left-hand end (Fig. 3) of this pusher being engageable with the contact arm 80.

The switch arm 81 is provided with a round head contact rivet 108 adapted to engage a flat faced contact rivet 110 secured to the contact arm 80. The contact arm 81 is held spaced from the slightly flexible strip 85 by a cup-shaped insulating pusher 112 secured to the strip 85. The upper end of the strip 85 may be flexed toward and away from the plug 56 by rotation of a manually operable knob 114 which is secured to a tubular shaft 116 extending freely through a protective casing 118 which surrounds the switch mechanism. The inner end of the shaft 116 has a flange 120 which is held against the base plate 66 by a somewhat resilient perforated bracket 122 surrounding the shaft 116 and secured to the base plate 66 by one or more screws 124. A cross pin or rivet 126 is secured to the tubular shaft 116 and extends diametrically thereof and through an elongated slot or kerf 128 formed in the end of an adjusting screw 130 which is threaded in the base plate 66, and the inner end of which engages the flexible strip 85.

The flange 120 of the tubular shaft 116 lies adjacent a pin 132 pressed in the base plate 66, and this flange is of reduced diameter throughout substantially 320° so as to leave a stop portion engageable with the pin 132, limiting the rotation of the tubular shaft to an arc of somewhat less than 320°. It will be clear from the foregoing that by rotation of the knob 114, the screw 130 will operate to flex the strip 85 more or less, and through the insulating pusher 112 to move the contact 108 toward or away from the contact 110.

As best shown in Figs. 5, 6, and 7, a latch 140 is pivotally secured to the upper end of the insulating strip 94, having a portion extending through a slot 142 formed in the strip 94, and having a portion 144 of increased width resting in a groove 146 extending transversely of the strip 94. The slot 142 is of sufficient size that the latch 140 may swing freely between its full and dotted line positions, as shown in Fig. 6. The latch 140 is substantially L-shaped in vertical cross section, having a downwardly extending portion 148 forming a sharp internal corner 149 with respect to the main portion of the latch. This corner is adapted to engage over and latch against a wedge-shaped edge 150 formed at the upper end of the base plate 66.

The latch 140 is adapted to be moved from the position in which it is shown in dotted lines in Fig. 3, to its full line position, by depression of a start button 152 carried at the upper end of a plunger 154, having a head 156 at its lower end, and suitably mounted for vertical sliding movement in the casing 118. The plunger 154 and start button 152 are arranged to be moved upwardly by a compression coil spring 158. The latch 140 is held in its unlatched position (the full line position in Fig. 6), by a wire spring 160 which is secured to the insulating plate 94 by a hollow rivet 162, and the arcuately bent ends 164 of which project through a hole 166 formed in the latch 144.

Secured to the upper end of the base plate 66 is an L-shaped bimetallic thermostatic element 153 which has an ear 155 extending sidewardly therefrom and lying directly beneath the latch 140 when the latter is in lateral position.

As will be apparent from Fig. 7, the spring 160 is biased to spread apart, and the end portions 164, by engaging the walls of the hole 166, exert a force on the latch which has an upward component and thus tends to swing the latch 140 upwardly. The spring 160 also serves as a means to hold the latch 140 assembled on the insulating plate 94.

The casing 118, as best shown in Fig. 1, encloses the operating parts of the control mechanism, being secured to brackets 62 and 64 by screws 167 (Fig. 1), and has a pair of sockets 168 (Fig. 4) secured therein for the reception of lamps W and R, which are distinctively colored, as white (or clear) and red, respectively.

The casing 118 forms a support for plug connector prongs 172 which are suitably insulated and are adapted detachably to engage in a conventional socket member 174 (Fig. 1) at the end of an extension cord 176 by which the apparatus may be plugged into a suitable electrical current outlet socket, using a conventional two prong plug 178 secured at the other end of the extension cord 176.

As best shown in Figs. 3 and 4, and as diagrammatically illustrated in Fig. 9, the connection prong 173 has one of the lead-in wires 52 of the heating element 36 connected thereto, the other lead-in wire 53 being soldered to the lower end of the contact arm 83.

The lamps W and R, which are of the gaseous discharge type, are connected in series across the connection prongs 172 and 173, and the two separate wires from these lamps are connected to lead-in wire 53, as well as to the wire leading to switch arm 83, by a detachable thimble 179, which is of insulating material and threaded over the twisted ends of these wires. The connection prong 172 is also connected to contact arm 80, and hence to contact rivet 110. (For ease of understanding, the mechanical relation of the parts shown in Fig. 9 is not exactly the same as in the structural figures, but the principle of operation is identical in all the figures.) With the parts, particularly the rubber plug 56 and the strip 94, in the position in which they are shown in Fig. 9, which is the position assumed when there is no pressure within the container and the start button 152 has not been operated, the leaf spring 84 presses against the outer surface of the plug 56 to provide an initial restraining force and to assist its internal elastic forces in aiding restoration to its normal position, and the contacts 96 and 98 are separated by virtue of the initial bias given to the contact arm 83, which carries the contact rivet 96.

When it is desired to utilize the cooker in the performance of a canning operation, a limited amount of water is placed in the container 20 and the cans or jars filled with food to be sterilized or preserved are placed in the container, being supported therein by a rack of customary construction. Thereafter the cover 22 is inserted and flexed to sealing position by means of the cam lever 26 so that the cover engages the seal within the bead 24 of the container 20. The vent valve 30 is removed and the connection plug 178 connected to a line socket. The operator then depresses the start button 152, causing the latch 140 to swing from the position in which it is shown in dotted lines in Fig. 3, to the position in which it is shown in full lines in said figure, such movement of the latch being effected against the very slight restraining force applied by the spring 160.

As the latch 140 swings downwardly, its downwardly bent portion 148 engages the wedge edge 150 of the base plate 66, and the latch 140 thus exerts a leftward pull upon the insulating strip 94, moving the latter sufficiently to cause electrical contacting engagement of the contact rivet 96 with its complementary contact rivet 98. When the latch is swung downwardly to its full extent, the wedge shaped edge 150 of the base plate 66 engages in the sharp corner 149, making substantially line contact therewith.

Since at this time there is no superatmospheric pressure within the container, the switch 108—110 will be closed and thus the closure of switch 96—98 will complete the circuit to the electrical resistance heating unit 36, and heat will be supplied to the water around the immersed heating element, raising the water to boiling temperature and evaporating sufficient water that the air initially trapped within the container will be exhausted through the vent valve opening, whereupon the operator, by noticing the emergence of steam from the port of the vent valve 30, will place the vent valve in position to close the port and the pressure within the container will commence rising due to the continued application of heat by the heating element 36.

Referring to Fig. 9, it will be noted that when both switches 96—98 and 108—110 are closed, the junction between the lamps W and R is at the same potential as connection prong 173. Thus the lamp W has no difference in potential across its electrodes. However, under these circumstances, the lamp R is in parallel with the heating element 36 and effectively connected across the connection prongs 172 and 173 so that it will be illuminated.

As the steam pressure within the container rises and the plug 56 bulges farther outwardly, it will cause the leaf spring 84 to engage the insulating strip 94 and swing the latter toward the left, thus freeing the corner 149 of the latch 140 from engagement with the edge 150, and permitting the spring 160 to snap the latch 140 upwardly to the position in which it is shown in full lines in Fig. 6. At the time this occurs, the contact 96 will be held in engagement with contact 98 by the bulging plug 56, and thus the circuit to the heating element 36 will remain closed.

As the steam pressure rises further within the container, and it reaches the desired sterilization or canning pressure temperature, this will be indicated by the pressure indicator 32 and also by the fact that steam will commence escaping past the gravity vent valve 30, causing the latter to "jiggle." Thus by sight and sound the operator is apprised that the required pressure temperature has been attained.

The knob 114 will usually be in such position that the switch 108—110 is still closed. The operator then grasps adjusting knob 114 and turns the latter clockwise, causing the screw 130 (through the intermediary of strip 85, pusher 112, and contact arm 81), to move the contact rivet 108 away from the contact 110. As soon as the circuit through the heating element is thus broken by the opening of switch 108—110, the white lamp W will be effectively in series with the heating element 36 across the connection prongs 172 and 173, and the white lamp will be illuminated because the voltage drop across resistance of the heating element 36 is negligible under these circumstances. The red lamp R will not be illuminated since its terminals are under these conditions at substantially the same potential.

As soon as the white lamp is illuminated, the operator will stop rotating the adjustment knob 114. Thereafter, due to radiation of heat and continued absorption of heat by food within the container, the pressure within the container will gradually drop, and the outward bulge of the plug 56 will decrease slightly until the rightward swinging of the contact arms 82 and 83 in unison will, through the moving away of the pusher 106, permit the contact arm 80 to flex to the right, again closing switch 108—110. The apparatus may readily be constructed on a commercial scale with commercial tolerances, so that this reclosing of the switch 108—110 will occur after drop of less than .50 p. s. i. as compared with the pressure in the container when this switch was opened by adjustment of the knob 114.

Whenever both switches 96—98 and 108—110 are closed, the red lamp R will be illuminated, indicating to the user that current is being applied to the heating element 36, while when either of these switches is open the white lamp W only will be illuminated, showing to the user that the pressure within the container is being maintained and that line current is still being supplied to the connection prongs 172, 173.

The opening and closing of the switch 108—110 will occur at intervals throughout the period of sterilization or preservation desired for the particular food in the container, and upon expiration of this desired period, the plug 178 or the socket 174 may be disconnected. The container and its contents will then gradually cool down to 212° F., that is, the pressure within the container will drop to atmospheric pressure, whereupon the user by swinging the handle 26 counterclockwise (Fig. 1) may permit the cover 22 to assume its warped shape, whereupon it may be readily removed from the container.

If the user of the apparatus inadvertently forgets to place water in the container, and after sealing it presses the start button 152, the heating element will be supplied with current in the manner previously explained. However, pressure will not build up in the container because of the lack of water therein, and the plug 56 will remain in the shape in which it is shown in Fig. 9. However, heat from the heating unit 36 will rapidly raise the temperature of the container walls and this heat will be conducted and radiated to the thermostatic bimetal 153, causing the latter to flex upwardly, and through engagement of its ear 155 with the latch 140, swing the latter from engagement with the edge 150.

It is because of the requirement of a very high degree of sensitivity in the holding power of the latch 140, that it is highly desirable that the engagement between these parts be by substantially line contact, and that the lug of the base plate 160, which has the edge 150 thereon, be bent forwardly, as best shown in Fig. 6, so that as the latch releases from contact with the edge 150, there will be no further contact of the latch with any part of the base plate 66, and the latch will thus snap to its upper position.

It will be understood that under the last assumed conditions, when the latch is released by the overheated bimetal 153, the spring arm 83 will flex to the right, the switch arm 82 being arrested when adjustment screw 100 comes into contact with the fixed stop 104, and the switch 96—98 will be opened, shutting off the supply of current to the heating element 36. The white lamp W will be illuminated so that by occasional inspection under these very unusual circumstances, the operator will be apprised that the canner is not operating properly by virtue of the fact that the lamps W and R do not blink in alternation.

Of course under the assumed condition, that of having started the heater without any water in it, the operator would also be apprised of the error by the fact that steam was not emitted during the period during which it was endeavored to exhaust the air from the container. However, under somewhat similar conditions, if the user failed to place sufficient water in the container upon starting, or if an excessive amount of water was permitted to escape as steam past the vent valve 30, the thermostat bimetal 153 would also operate to open the circuit to the heating element and to cause steady illumination of the lamp W. Such steady illumination of the lamp W would constitute an indication that the canner was not operating properly.

From the foregoing, it will be seen that I have provided a pressure canner and control apparatus therefor which will operate satisfactorily under a wide range of normal and inadvertently abnormal conditions. Under normal conditions it will reduce fluctuations in pressure during the preserving or sterilizing period to a range of less than .50 p. s. i. By thus greatly limiting the pressure fluctuations, the canning time may be very accurately determined to produce canned food of the most desirable physical and chemical characteristics, improving both the taste and appearance of most canned foods.

Furthermore, any so called leaking or boiling off of the fluid within the jars or cans believed by some to be due to sudden and wide range fluctuations of the pressure within the container, is completely avoided, or at least reduced to a negligible minimum.

The fact that the user in effect calibrates the control apparatus for each canning cycle, by adjustment of the knob 114, makes it possible to construct the apparatus with parts made to large tolerances. And furthermore, compensation is made for any changes in most of the parts, due to wear, warpage, temperature changes, etc., each time the pressure canner is used, by the adjustment of the knob 114.

Since the lead-in wire 53 is joined to the wire connected to the contact arm 83, as well as to two of the wires leading from the terminals of the two lamps, by a single detachable thimble 179, it will be clear (by reference to Figs. 3 and 4), that the casing 118 and all parts carried thereby may readily be detached from the container and control switch assembly by removal of the screws 167 and by removing the thimble 179 to permit disconnection of the four wire ends which are normally held together thereby. Because of this construction the contact and switch parts are made readily accessible for servicing.

While in the foregoing description the invention has been described as applied particularly to a pressure canner, it will be understood that the invention is applicable with equal or possibly greater advantages, in pressure cooking.

While I have shown and described a preferred embodiment of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. In a pressure control apparatus for pressure cookers and canners heated by connection to a source of electrical energy, the combination of a pressure container, an electrical heating element therefor, a flexible plug secured in a wall of the container, a first switch and a second switch connected in series with the heating element and the source of current, manually operable means for closing said first switch and including a latch for holding said first switch in closed position, and means operable by the bulging of said flexible plug upon the attainment of substantial pressure within the container to hold said first switch closed and release said latch, and upon attainment of a predetermined higher pressure within the container to open said second switch, said means being operable upon a decrease in pressure below said predetermined value to close said second switch.

2. The combination set forth in claim 1, in which there is included a thermostatic bimetal part operable to release said latch when the temperature of the cooker becomes excessively high.

3. The combination set forth in claim 1, in which the second switch is provided with means manually operable while the container is under pressure to adjust it to open at a pressure slightly lower than said predetermined higher pressure.

4. The combination set forth in claim 1, in which the first switch includes a flexible switch arm and adjustable stop to limit movement of the arm in the direction to which it moves to close the switch, whereby the switch may be adjusted so that it will open when the pressure in the container drops to a certain pressure.

5. Means for controlling the steam pressure in a container having a pressure indicator associated therewith, having water therein, and an electrical heater for the water, comprising, a flexible pressure responsive element forming part of the heater wall, and a switch mechanism mounted on the outside wall of the container adjacent the pressure responsive element, said switch mechanism having a pair of switches connected in series for controlling the supply of electrical energy to the heater, the first of said switches being normally open and the second being normally closed, manually operable means including a holding latch for closing the first said switches, said switches comprising pairs of leaf springs having their free ends substantially in alignment with the flexible portion of the pressure responsive element with the first switch closer to said element and adapted to be operated directly thereby, resilient means to release said latch when said first switch has been engaged and slightly moved by the pressure responsive element as a result of the presence of substantial steam pressure within the container, means operated by the first switch upon continued movement thereof as a result of increasing pressure in the container to open said second switch, and manually operable means to effect calibration of the pressure at which said second switch is opened by said first switch.

6. Means for controlling the steam pressure in a container having water therein and an electrical heater for the water, comprising, a flexible pressure responsive element forming part of the container wall, and a switch mechanism mounted on the outside wall of the container adjacent the pressure responsive element, said switch mechanism having a pair of switches connected in series for controlling the supply of electrical energy to the heater, the first of said switches being normally open and the second being normally closed, spring returned manually operable means for closing the first said switches, a latch mechanically connected to a part of the first switch to hold the latter closed upon release of the manually operable means, said switches comprising pairs of leaf springs having their free ends substantially in alignment with the flexible portion of the pressure responsive element with the first switch closer to said element and adapted to be operated directly thereby, resilient means to release said latch when said first switch has been engaged and moved by the pressure responsive element to an extent resultant from the presence of substantial steam pressure within the container, means operated by the first switch upon continued movement thereof as a result of increasing pressure in the container to open said second switch, and manually operable means to effect calibration of the pressure at which said second switch is opened by said first switch.

References Cited in the file of this patent

UNITED STATES PATENTS

| Number | Name | Date |
|---|---|---|
| 1,014,450 | Carlsson | Jan. 9, 1912 |
| 1,387,686 | Chase | Aug. 16, 1921 |
| 1,558,651 | Thompson | Oct. 27, 1925 |
| 2,269,689 | Reichold | Jan. 13, 1942 |
| 2,274,930 | Newton | Mar. 3, 1942 |
| 2,289,882 | Myers | July 14, 1942 |
| 2,362,675 | Stebbins | Nov. 14, 1944 |
| 2,369,932 | Allen | Feb. 20, 1945 |
| 2,422,974 | Newell | June 24, 1947 |
| 2,424,393 | Graves | July 22, 1947 |
| 2,434,016 | Shields | Jan. 6, 1948 |
| 2,439,795 | Clark | Apr. 20, 1948 |
| 2,454,962 | Brown | Nov. 30, 1948 |
| 2,467,896 | Lee | Apr. 19, 1949 |
| 2,472,451 | Whitney | June 7, 1949 |